US009579571B2

(12) United States Patent
Pacyga (10) Patent No.: US 9,579,571 B2
(45) Date of Patent: Feb. 28, 2017

(54) SYSTEM AND METHOD FOR PROVIDING A MARKETPLACE OF USER-INVOKABLE INSTRUCTIONS USED BY A GAME APPLICATION IN AN EXPRESSION OF A GAME

(71) Applicant: KABAM, INC., San Francisco, CA (US)

(72) Inventor: Nathan Pacyga, Lafayette, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 14/942,870

(22) Filed: Nov. 16, 2015

(65) Prior Publication Data

US 2016/0067603 A1 Mar. 10, 2016

Related U.S. Application Data

(63) Continuation of application No. 13/734,821, filed on Jan. 4, 2013, now Pat. No. 9,186,583.

(51) Int. Cl.
*A63F 13/00* (2014.01)
*A63F 13/35* (2014.01)
(Continued)

(52) U.S. Cl.
CPC .............. *A63F 13/35* (2014.09); *A63F 13/12* (2013.01); *A63F 13/352* (2014.09); *A63F 13/67* (2014.09);
(Continued)

(58) Field of Classification Search
CPC ............. G07F 17/3272; G07F 17/3274; G07F 17/3279; G07F 17/3281
(Continued)

(56) References Cited

U.S. PATENT DOCUMENTS 7,937,314 B2   5/2011 Jung
8,229,796 B2 *  7/2012 Langan ................... A63F 13/12
                                                                    463/1
(Continued)

OTHER PUBLICATIONS

"Neat Bot—printed Nov. 20, 2012, 1 page—Introducing the Next Generation Evony Bot from evonybots.com", Feed Reader, http://feedreader.com/feed/Evony_Bots_Free_Evony_Bot_Download_and_Information/202559088.
(Continued)

*Primary Examiner* — James S McClellan
(74) *Attorney, Agent, or Firm* — Sheppard Mullin Richter & Hampton LLP (57) ABSTRACT

The disclosure relates to systems and methods for providing a marketplace of user-invokable instructions used by a game application in an expression of a game. The user-invokable instructions may include automation of tasks related to a game that would otherwise require manual intervention by users, intelligence that encode automatic reactions to game events such as surrounding conditions or attacks from others, and/or instructions for automatically performing one or more in-game tasks. A marketplace interface may facilitate offers to provide user-invokable instructions. Each offer may include consideration to obtain a corresponding set of user-invokable instructions. The consideration may include real world currency, one or more virtual items, an exchange for a task to be performed, an exchange for an alliance or other in-game cooperation, an exchange for another set of user-invokable instructions, and/or other consideration.

20 Claims, 4 Drawing Sheets

(51) Int. Cl.
    *A63F 13/30*       (2014.01)
    *A63F 13/67*       (2014.01)
    *A63F 13/792*     (2014.01)
    *A63F 13/352*     (2014.01)

(52) U.S. Cl.
    CPC ...... *A63F 13/792* (2014.09); *A63F 2300/575* (2013.01)

(58) Field of Classification Search
    USPC ................................................ 463/9, 30, 42
    See application file for complete search history.

(56) References Cited

U.S. PATENT DOCUMENTS

| | | |
|---|---|---|
| 9,186,583 B1 | 11/2015 | Pacyga |
| 2003/0014423 A1 | 1/2003 | Chuah |
| 2003/0069787 A1 | 4/2003 | Tendon |
| 2007/0238499 A1 | 10/2007 | Wright |
| 2008/0255957 A1 | 10/2008 | Erdem |

OTHER PUBLICATIONS

Main page Evony-bot website, http://evony.travianbot.com, printed Nov. 20, 2012, 2 pages.

Engine Features—Scripting, Dreamatrix, http://www.dreamatrix.net/site/index.php/features/features/scripting.html, printed Nov. 20, 2012, 2 pages.

"5—The Construction of soldiers", 5.—Build soldiers, http://evony.travianbot.com/Help/English/5.html, printed Nov. 20, 2012, 1 page.

"4—Attacks on the enemies", 4—Attacks on enemies, http://evony.travianbot.com/Help/English/4.html, printed Nov. 20, 2012, 1 page.

\* cited by examiner

SYSTEM AND METHOD FOR PROVIDING A MARKETPLACE OF USER-INVOKABLE INSTRUCTIONS USED BY A GAME APPLICATION IN AN EXPRESSION OF A GAME

FIELD OF THE INVENTION

The disclosure relates to systems and methods for providing a marketplace of user-invokable instructions selectable by a user to be used in a game application in an expression of a game.

BACKGROUND OF THE INVENTION

Video games and other applications that display a virtual space for interaction typically include various actions that must be manually performed by a user playing a video game or otherwise interacting with the virtual space. Although in some instances artificial intelligence ("AI") can be used to automatically perform various actions, oftentimes the AI causes game elements to behave in a manner that is not anticipated, leading to undesirable outcomes such as a lost virtual battle.

Relying on AI or having to manually manage game elements such as in-game objects can result in a tedious gameplay experience as well as an inability to react quickly enough to game events.

SUMMARY OF THE INVENTION

The disclosure relates to systems and methods for providing a marketplace of user-invokable instructions used by a game application in an expression of a game. The user-invokable instructions may include automation of tasks related to a game that would otherwise require manual intervention by users, intelligence that encode automatic reactions to game events such as surrounding conditions or attacks from others, and/or automatically perform one or more in-game tasks.

A user may use the user-invokable instructions during gameplay in an expression of the game application to facilitate the automation of tasks. For example, the user-invokable instructions when selected by the user may cause control of one or more in-game objects associated with the user during gameplay.

The user may acquire the user-invokable instructions in various ways. For example, the user may develop the user-invokable instructions for personal use and/or for selling in a marketplace. Various other entities ("sellers") may provide user-invokable instructions to be offered for sale or otherwise acquired by other entities ("buyers"). For example, a game developer, another user, and/or other entity may offer user-invokable instructions via the marketplace. The user may buy or otherwise accept the offer for user-invokable instructions from the seller.

A marketplace interface may facilitate the transaction between the buyer and seller. For example, the marketplace interface may initiate offers for sets of user-invokable instructions. Each offer may include consideration to obtain a corresponding set of user-invokable instructions. The consideration may include real world currency, one or more virtual items, an exchange for a task to be performed, an exchange for an alliance or other in-game cooperation, an exchange for another set of user-invokable instructions, and/or other consideration.

The marketplace interface may receive an acceptance of the offers from users. Upon acceptance, the marketplace interface may cause the appropriate sets of user-invokable instructions to be provided. In some embodiments, the appropriate user-invokable instructions are provided to the user at a user account maintained by the system. In these embodiments, when a user logs on to play an online game or otherwise identifies the user with a game server, the user-invokable instructions accepted (e.g., purchased) by the user may be made selectable for use during gameplay. In some embodiments, the appropriate user-invokable instructions may be provided to the user via a download to the user's device. In these embodiments, the user may select the user-invokable instructions for use during gameplay from local storage.

The sets of user-invokable instructions may individually be associated with a description that includes keywords or classifications that indicate the type of actions or in-game objects that may be controlled by the instructions. In these embodiments, the marketplace interface may automatically suggest and/or otherwise determine which ones of the sets of user-invokable instructions to offer for sale based on a user profile. The user profile may include actions by the user, prior purchases/acquisitions of user-invokable instructions, prior offers to sell user-invokable instructions, in-game actions (e.g., manually arranging virtual troops may cause a suggestion of user-invokable instructions related to automatically arranging virtual troops), and/or other user information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to systems and methods for providing a marketplace of user-invokable instructions used by a game application in an expression of a game.

Figure 1:
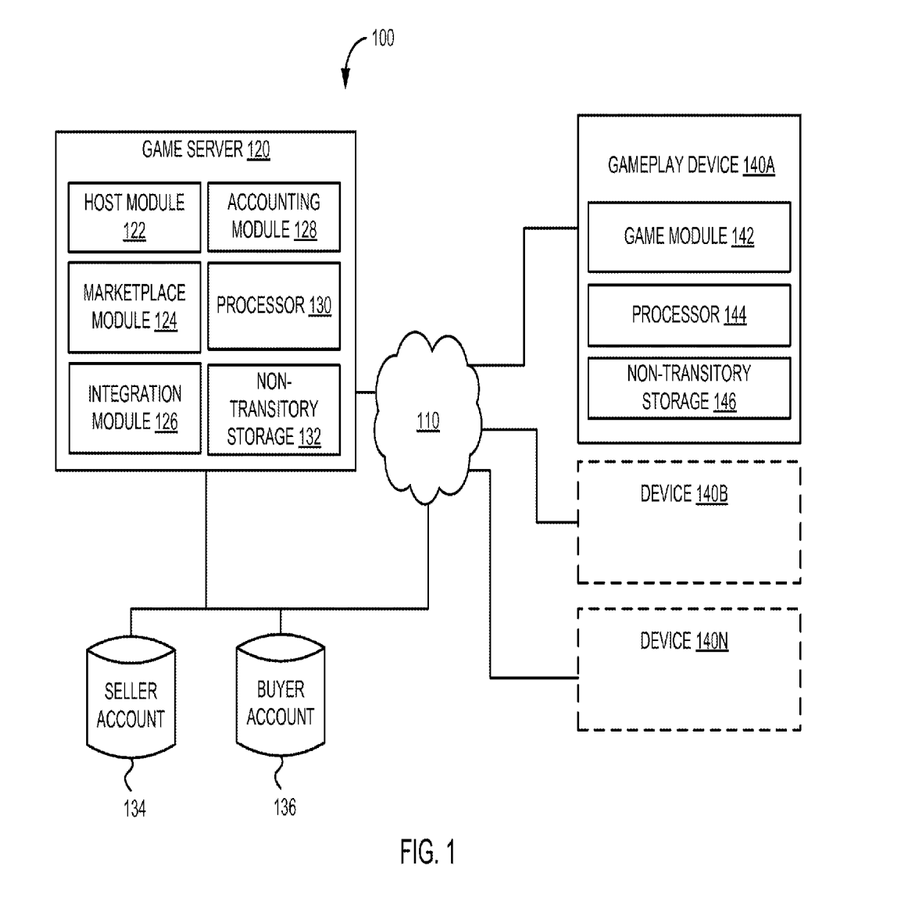
FIG. 1 illustrates a system configured to provide a marketplace of user-invokable instructions used by a game application in an expression of a game, according to an embodiment of the invention.

FIG. 1 illustrates a system 100 configured to provide a marketplace of user-invokable instructions used by a game application in an expression of a game, according to an embodiment of the invention. System 100 may include a game server 120, one or more client computing platforms 140 (illustrated as client computing platform 140A, 140B, . . . , 140N), and/or other components.

System 100 may provide a marketplace that facilitates exchange of user-invokable instructions. The format of user-invokable instructions may include natural language text, a programming script such as JAVASCRIPT, and/or other formats that can convey instructions. The user-invokable instructions may be selected by a user to control at least one aspect of an expression of a game.

In some embodiments, a user may select user-invokable instructions to control in-game objects associated with the users. For example, various sets of user-invokable instructions may control battle tactics/formations of virtual troops. Combinations of attacks and/or defenses to be executed by a character, set plays to be executed in a simulated team sport, artificial intelligence to be executed in control of one or more characters with rules about responding to certain stimuli and/or conditions in the virtual space, and/or other instructions.

In this manner, the user-invokable instructions may be selected by the user to automate otherwise manual tasks. For example, instead of manually placing troops in a battle formation, causing an attack, and/or responding to an attack, a user may select user-invokable instructions that control the battle formation, control attacks, responds to an attack, and/or otherwise automate a task that would otherwise require manual intervention by the user.

By providing a marketplace for various user-invokable instructions, system 100 facilitates the exchange of such instructions by various parties. For example, a developer (e.g., a game studio) may offer user-invokable instructions to enhance or otherwise automate certain aspects of gameplay, a first user may offer another user a set of instructions that the first user developed, and/or other parties may offer another party such instructions.

The user-invokable instructions may be implemented using one or more gameplay configurations. A hosted gameplay configuration may be used in which game server 120 hosts a game and communicates at least some game content to one or more client computing platforms 140. A standalone configuration may be used in which a client computing platform 140 is configured to locally provide game content. A hybrid configuration may be used in which game content may be communicated from the game server 120 and/or determined locally by client computing platform 140. Whichever configuration is used, user-invokable instructions may be acquired via the marketplace and selected by a user to control at least one aspect of gameplay in an expression of a game.

Game server 120 may include one or more processors 130 configured to execute one or more modules such as a host module 122, a marketplace module 124, an integration module 126, an accounting module 128, and/or other modules. Client computing platforms 140 may include one or more processors 144 configured to execute one or more modules such as a game module 142.

Host module 122 may be configured to host gameplay over network 110 such as the Internet in an interactive manner with one or more client computing platforms 140. In some embodiments, game server 120 may provide game module 142 for execution at client computing platform 140. In a non-limiting example, game module 142 may be configured as an ADOBE FLASH file that executes via a plug-in installed at a browser of client computing platform. The ADOBE FLASH file includes instructions that when expressed causes a FLASH-based game to be playable at client computing platform 140.

Game module 142 when executed at the client computing platform 140 causes the client computing platform to generate an expression of the game application. In hosted gameplay embodiments, game module 142 when executed at the client computing platform 140 causes the client computing platform to communicate with host module 122.

In some embodiments, host module 122 may communicate with the one or more client computing platforms 140 via game module 142 executing at the client computing platforms. In particular, host module 122 may receive information related to gameplay from the client computing platforms 140. For example, game module 142 may present a selectable list of user-invokable instructions that are available to (e.g., was acquired by) the user. The information provided from client computing platform 140 to host module 122 may include a selection of the user-invokable instructions that is to be used during an expression of the game application.

In some embodiments, host module 122 and/or game module 142 may execute the user-invokable instructions to cause at least one aspect of gameplay to be affected during gameplay. For example, in response to a selection of user-invokable instructions that automatically generate a formation of troops, host module 122 and/or game module 142 may automatically cause the formation of troops based on the user-invokable instructions selected by the user. In this manner, whether playing in a hosted, hybrid, or standalone configuration, the user may automatically cause at least one aspect of gameplay to be affected such as by automatically creating a troop formation that would otherwise have to be manually placed by the user. The user-invokable instructions may be removably loadable such that when the aspect of gameplay related to the instructions have been affected based on execution of the instructions, execution of the instructions may be discontinued and later selected and used as needed.

In some embodiments, host module 122 and/or game module 142 may generate an instruction builder interface that may be used to generate user-invokable instructions. The instruction builder interface may be generated specifically for a particular game or application based on various events or actions that may be automated for the particular game or application. In this manner, users may be assisted in generating user-invokable instructions.

In some embodiments, marketplace module 124 may be configured to generate a marketplace interface (such as an interface illustrated in FIG. 2) that provides a marketplace for offering and/or acquiring user-invokable instructions.

Marketplace module 124 may initiate presentation of offers of individual ones of sets of user-invokable instructions. The presentation of the offers may include information related to the sets of user-invokable instructions such as, for example, a description of the instructions that describes one or more functions provided by the instructions (e.g., whether the instructions relate to troop formations, etc.), the consideration (e.g., cost), an originator/developer of the instructions, and/or other information. As would be appreciated, the information and/or the instructions may be stored in a memory such as non-transitory storage media 132. In some embodiments, individual ones of the sets of user-invokable instructions may cause an aspect of gameplay to be affected.

Marketplace module 124 may receive an acceptance of an offer from a user and provide an accepted first instruction set to the user such that the user may use the first instruction set in the game application. For example, the user may select or otherwise use the first instruction set in association with game module 142 executing at client computing platform 140, which may execute the first instruction set in an expression of the game application.

In some embodiments, an offer may enumerate a consideration required for acceptance of the offer such that acceptance of the offer from the user includes payment of the required consideration. The required consideration may include a real world money payment, one or more virtual items as payment, an exchange of at least one other set of user-invokable instructions (e.g., such that users may exchange user-invokable instructions), an agreement to form a virtual alliance, or an agreement to perform a task in an expression of the game application (e.g., attack another user's enemy base), and/or other consideration.

In some embodiments, marketplace module 128 may provide the appropriate sets of user-invokable instructions at an account associated with a user who accepted the offer, wherein the appropriate sets of user-invokable instructions is stored at the account. For example, the account associated with the user may be stored in a database in storage media 134.

In some embodiments, integration module 126 may be configured to integrate accepted sets of user-invokable instructions with gameplay. For example, integration module 126 may query the account associated with the user to determine which (if any) sets of user-invokable instructions have been acquired by the user via, for example, marketplace module 124. Integration module 126 may integrate with host module 122 and/or game module 142 such that the sets of user-invokable instructions are made available to the user during gameplay. In this manner, the user may purchase or otherwise acquire sets of user-invokable instructions and have them integrated during gameplay. In some embodiments, instead of or in addition to such integration, the user may download or otherwise locally store the sets of user-invokable instructions for use in an expression of the game application.

In some embodiments, accounting module 128 may be configured to manage transactions related to sets of user-invokable instructions. For example, accounting module 128 may credit a seller account 134 with the value of consideration of an accepted set of user-invokable instructions and debit a buyer account 136 with the value of consideration. Seller account 134 and/or buyer account 136 may store real money values, virtual items, tasks to be completed, alliances to be made, and/or other consideration used to facilitate the acquisition of sets of user-invokable instructions from a user (which may include a developer entity) to another user.

In some embodiments, accounting module 128 may be accessed by the various parties to a transaction to determine a status of payment such as a real world money payment or whether promises such as to perform a particular task has been performed.

Client computing platform 140 may communicate with game server 120 via network 110. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Those having skill in the art will recognize that game server 120 and gaming device 140 may each comprise one or more processors (130, 144), one or more interfaces (to various peripheral devices or components), non-transitory storage media (132, 146), and/or other components coupled via a bus. The non-transitory storage media may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

In some embodiments, non-transitory storage media 132 may be configured to store sets of user-invokable instructions to be implemented in expressions of a game application upon selection by users to control, in the expressions of the game applications, sets of in-game objects associated with the users, the sets of user-invokable instructions including a first instruction set. In some embodiments, non-transitory storage media 132 may be configured to store game module 142, which may be communicated to client computing platforms 140 for expression of the game application.

Figure 2:
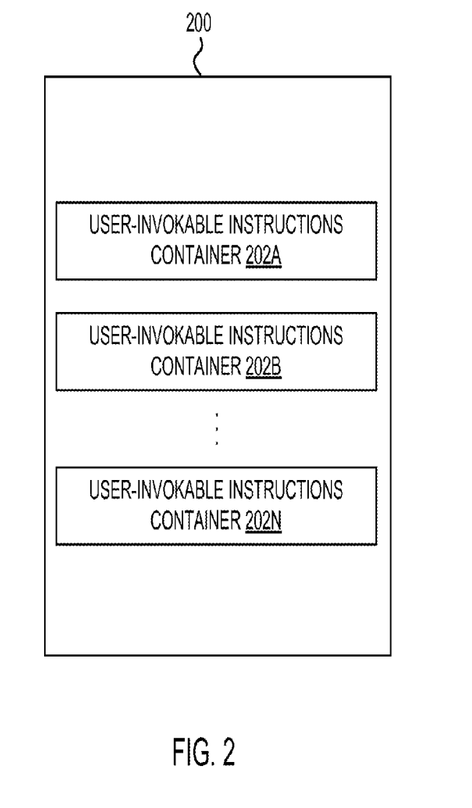
FIG. 2 illustrates an example of a marketplace interface for offering and/or acquiring user-invokable instructions, according to an embodiment of the invention.

FIG. 2 illustrates an example of a marketplace interface 200 for offering and/or acquiring user-invokable instructions, according to an aspect of the invention. Marketplace interface 200 may be configured as a webpage, a mobile application interface, and/or other type of user interface. Marketplace interface 200 may display user-invokable instructions containers 202 (illustrated in FIG. 2 as user-invokable instructions containers 202A, 202B, . . . , 202N). User-invokable instructions containers 202 may offer individual sets of user-invokable instructions in exchange for certain consideration.

User-invokable instructions containers 202 may include information related to a set of user-invokable instructions being offer such as a description, consideration required (e.g., a sale price), and/or other information related to the instructions being offered for sale. A user may accept one or more offers by selecting a corresponding user-invokable instructions container 202. As would be appreciated, electronic commerce interface components such as user reviews of the instructions, selection boxes, electronic shopping carts, and/or other electronic commerce interface components may be used as well.

Upon selection of a user-invokable instructions container 202, the user may be provided with a corresponding set of user-invokable instructions offered by the selected user-invokable instructions container 202. For example, marketplace module 124 may cause the corresponding set of user-invokable instructions to be provided to the user at a user account, initiating a download of the set of user-invokable instructions to a client computing platform 140 of the user, and/or otherwise providing the set of user-invokable instructions to the user. The user may locally store the set of user-invokable instructions and may use, from a local memory, the set of user-invokable instructions during gameplay.

In some embodiments, all available user-invokable instructions may be provided by the marketplace interface 200. In other embodiments, user-invokable instructions determined to be relevant to the user may be offered. All or a portion of available user-invokable instructions may be sorted based on popularity, consideration (e.g., price), type of consideration, and/or other feature. Although not illustrated, marketplace interface 200 may include a search function that allows users to search for particular user-invokable instructions based on their description (e.g., keyword, types, etc.).

Figure 3:
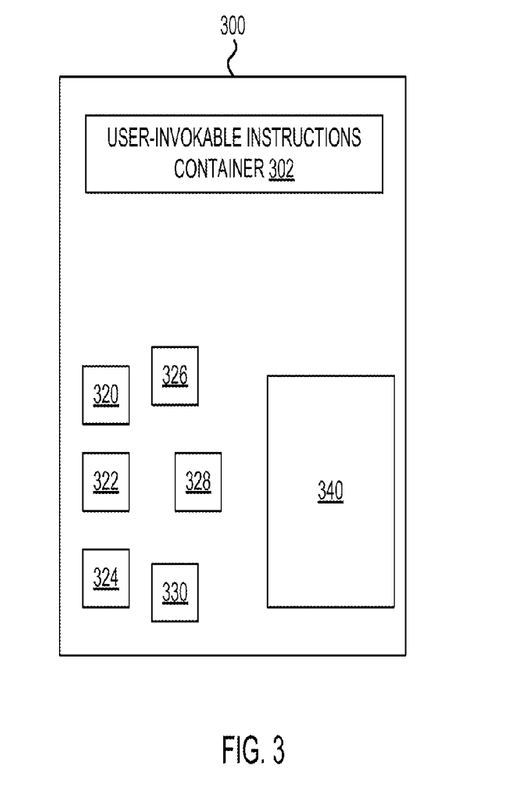
FIG. 3 illustrates an example of offering user-invokable instructions during gameplay within a game interface of an expression of a game application, according to an embodiment of the invention.

FIG. 3 illustrates an example of offering user-invokable instructions during gameplay within a game interface 300 of an expression of a game application, according to an embodiment of the invention. Game interface 300 may display a game space for a game application expressed at client computing platform 140. As illustrated in FIG. 3, a user may be manually performing a task on game interface 300 such as arranging virtual troops 320, 322, 324, 326, 328, 330 into a formation to attack a virtual base 340.

Game module 130 and/or marketplace module 124 may recognize the manually performed tasked and suggest one or more sets of user-invokable instructions. In some embodiments, game module 130 and/or marketplace module 124 may compare the task with descriptors or keywords related individual ones of a plurality of sets of user-invokable instructions being offered by one or more sellers.

For example, game module 130 and/or marketplace module 124 may recognize that the user is manually placing the virtual troops and may determine relevant sets of user-invokable instructions related to automatically placing troops and/or controlling their behavior.

Game module 130 and/or marketplace module 124 may offer the relevant sets of user-invokable instructions live during gameplay and/or at a later time. For example, game module 130 and/or marketplace module 124 may cause user-invokable instructions container 302 to be displayed within the game interface 300 during gameplay. In some embodiments, game module 130 and/or marketplace module 124 may offer relevant sets of user-invokable instructions via email, short message service ("SMS") text message, marketplace interface (an example of which is illustrated in FIG. 2), and/or other communication channel.

Figure 4:
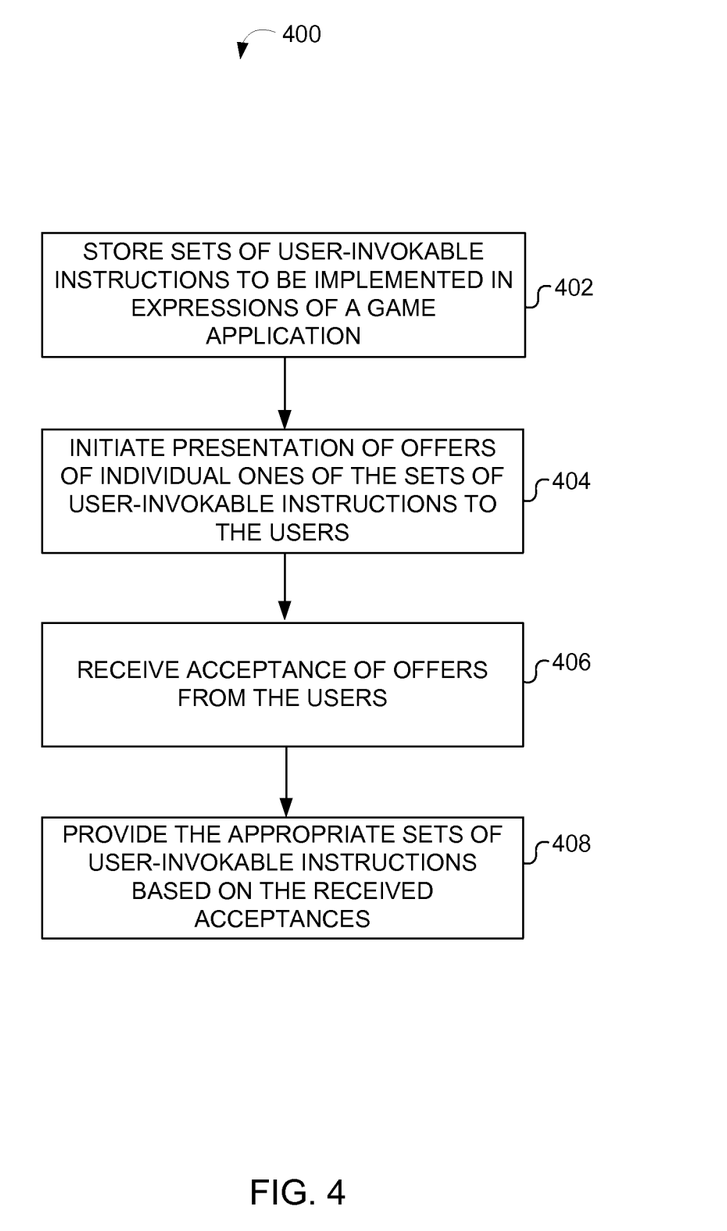
FIG. 4 illustrates a process of providing a marketplace of user-invokable instructions used by a game application in an expression of a game, according to an embodiment of the invention.

FIG. 4 illustrates a process 400 of providing a marketplace of user-invokable instructions used by a game application in an expression of a game, according to an embodiment of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, sets of user-invokable instructions to be implemented in expressions of a game application may be stored. For example, sellers wishing to offer their user-invokable instructions for others to obtain (and pay for) may upload such instructions to be offered in the marketplace. In some embodiments, upon selection by users, sets of in-game objects associated with the users may be controlled by individual ones of the sets of user-invokable instructions. The instructions may be stored for offering in the marketplace.

In an operation 404, presentation of offers of individual ones of the sets of user-invokable instructions to the users may be initiated. In an operation 406, acceptance of offers from the users may be received. For example, a user may select an offer to purchase at least a first instruction set from among the sets of user-invokable instructions.

In an operation 408, the appropriate sets of user-invokable instructions based on the received acceptances may be provided. Responsive to reception of an acceptance of the first offer from a user, the first instruction set is provided to the user for use in expressions of the game application. For example, the user may download the appropriate sets of user-invokable instructions and use them during gameplay to control one or more in-game objects. In some embodiments, the appropriate sets of user-invokable instructions may be stored at a user account associated with the user so that the user may access the instructions during gameplay.

Figure 5:
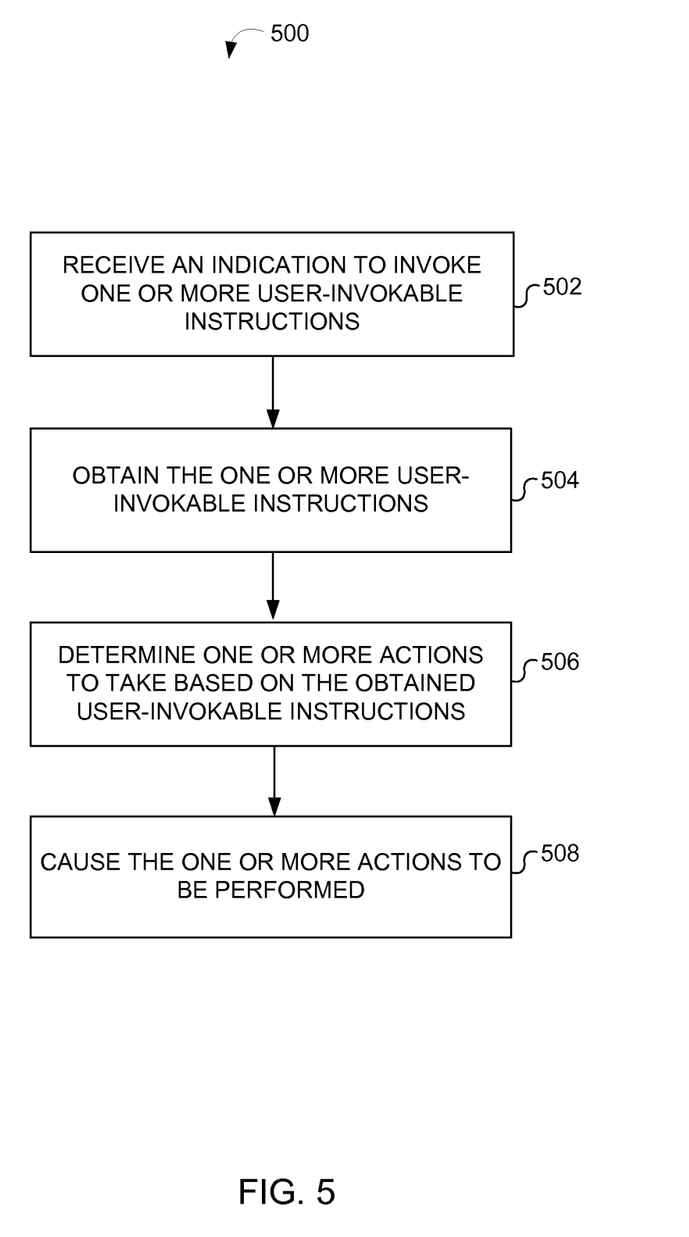
FIG. 5 illustrates a process of performing one or more actions based on one or more user-invokable instructions used by a game application in an expression of a game, according to an embodiment of the invention.

FIG. 5 illustrates a process 500 of performing one or more actions based on one or more user-invokable instructions used by a game application in an expression of a game, according to an embodiment of the invention.

In an operation 502, an indication to invoke one or more user-invokable instructions may be received. For example, a user may indicate that a particular set of user-invokable instructions should be used to automate one or more tasks that otherwise would have to be performed manually by the user.

In an operation 504, the one or more user-invokable instructions may be obtained. For example, the instructions may be obtained from the user via upload from local storage of a client computing platform used by the user to play the game. In some embodiments, the instructions may be obtained from a user account stored at a computing device remote from the client computing platform, such as game server 140.

In an operation 506, one or more actions to be taken may be determined based on the one or more user-invokable instructions. For example, the instructions may encode particular actions to take such as controlling one or more in-game objects. In an operation 508, the one or more actions may be caused to be performed.

Although described with respect to video games, the disclosure may be used in other contexts in which a virtual space may be expressed at a client computing platform and actions may be automated by one or more user-invokable scripts. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to provide a marketplace of user-invokable instructions used by a game application in an expression of a game, the system comprising:

non-transitory storage media that stores sets of user-invokable instructions to be implemented in expressions of a game application upon selection by users to control, in the expressions of the game application, sets of in-game objects associated with the users, the individual sets of user-invokable instructions including commands that simulate manual, coordinated input by users of instructions selectable by users to control in-game objects to perform a series of in-game actions, the sets of user-invokable instructions including a first instruction set;

one or more processors configured by machine-readable instructions to:

initiate presentation of offers of individual ones of the sets of user-invokable instructions to the users, the offers including a first offer of the first instruction set;

receive acceptance of offers from the users; and provide the appropriate sets of user-invokable instructions based on the received acceptances such that, responsive to reception of an acceptance of the first offer from a first user, the first instruction set is provided to the first user for use in expressions of the game application; and, wherein, responsive to a request from the first user to implement the first instruction set in an expression of the game application, the first instruction set causes the one or more objects to perform the first series of movements in the expression of the game application.

2. The system of claim 1, wherein the one or more processors are further configured by machine-readable instructions to     obtain a second instruction set of user-invokable instructions from the first user;

store the second instruction set to the storage media; and     present offers of the second instruction set to other users.

3. The system of claim 1, wherein the one or more processors are is further configured by machine-readable instructions such that the first offer enumerates a consideration required for acceptance of the offer, and such that acceptance of the first offer from the first user includes payment of the required consideration.

4. The system of claim 3, wherein the required consideration includes real world money and/or one or more virtual items.

5. The system of claim 4, wherein the required consideration includes a second instruction set of user-invokable instructions, an agreement to form a virtual alliance, or an agreement to perform a task in an expression of the game application.

6. The system of claim 1, wherein the individual ones of the sets of user-invokable instructions are removably loadable such that the individual ones of the sets of user-invokable instructions may be used as needed.

7. The system of claim 1, wherein the at least one aspect that is changed comprises an automation of an otherwise manual task.

8. The system of claim 1, wherein the one or more processors are further configured by machine-readable instructions to:

provide the appropriate sets of user-invokable instructions at an account associated with a user who accepted the offer, wherein the appropriate sets of user-invokable instructions is stored at the account.

9. The system of claim 1, wherein the one or more processors are configured by machine-readable instructions to:

integrate the appropriate sets of user-invokable instructions into an expression of the corresponding game.

10. The system of claim 1, wherein the one or more processors are configured by machine-readable instructions to:

maintain transaction information associated with the offers and the acceptance, thereby facilitating transfer of the one or more loadable scripts based on the offer and the acceptance.

11. A computer-implemented method of providing a marketplace of user-invokable instructions used by a game application in an expression of a game, the method being implemented in a computer that includes one or more processors configured by machine-readable instructions, the method comprising:

storing, at non-transitory storage media, sets of user-invokable instructions to be implemented in expressions of a game application upon selection by users to control, in the expressions of the game application, sets of in-game objects associated with the users, the individual sets of user-invokable instructions including commands that simulate manual, coordinated input by users of instructions selectable by users to control in-game objects to perform a series of in-game actions, the sets of user-invokable instructions including a first instruction set;

initiating, by the one or more processors, presentation of offers of individual ones of the sets of user-invokable instructions to the users, the offers including a first offer of the first instruction set;

receiving, by the one or more processors, acceptance of offers from the users; and     providing, by the one or more processors, the appropriate sets of user-invokable instructions based on the received acceptances such that, responsive to reception of an acceptance of the first offer from a first user, the first instruction set is provided to the first user for use in expressions of the game application; and, wherein, responsive to a request from the first user to implement the first instruction set in an expression of the game application, the first instruction set causes the one or more objects to perform the first series of movements in the expression of the game application.

12. The method of claim 11, the method further comprising:

obtaining, by the one or more processors, a second instruction set of user-invokable instructions from the first user;

storing, by the one or more processors, the second instruction set to the storage media; and     presenting, by the one or more processors, offers of the second instruction set to other users.

13. The method of claim 11, wherein the first offer enumerates a consideration required for acceptance of the offer, and acceptance of the first offer from the first user includes payment of the required consideration.

14. The method of claim 13, wherein the required consideration includes real world money and/or one or more virtual items.

15. The method of claim 14, wherein the required consideration includes a second instruction set of user-invokable instructions, an agreement to form a virtual alliance, or an agreement to perform a task in an expression of the game application.

16. The method of claim 11, wherein the individual ones of the sets of user-invokable instructions are removably loadable such that the individual ones of the sets of user-invokable instructions may be used as needed.

17. The method of claim 11, wherein the at least one aspect that is changed comprises an automation of an otherwise manual task.

18. The method of claim 11, the method further comprising:

providing, by the one or more processors, the appropriate sets of user-invokable instructions at an account associated with a user who accepted the offer, wherein the appropriate sets of user-invokable instructions is stored at the account.

19. The method of claim 11, the method further comprising:
integrating, by the one or more processors, the appropriate sets of user-invokable instructions into an expression of the corresponding game.

20. The method of claim 11, the method further comprising:
maintaining, by the one or more processors, transaction information associated with the offers and the acceptance, thereby facilitating transfer of the one or more loadable scripts based on the offer and the acceptance.

* * * * *